Sept. 17, 1963         J. T. KENNEY ETAL         3,104,106
              ARITHMETICAL TEACHING AID GAME
Filed Aug. 31, 1960                              4 Sheets-Sheet 1

INVENTORS
JAMES T. KENNEY
CHARLES J. O'LOUGHLIN
BY *John E. Becker*
                ATTORNEY Sept. 17, 1963

J. T. KENNEY ETAL 3,104,106

ARITHMETICAL TEACHING AID GAME

Filed Aug. 31, 1960

INVENTORS
JAMES T. KENNEY
CHARLES J. O'LOUGHLIN

BY *John E. Becker*

ATTORNEY

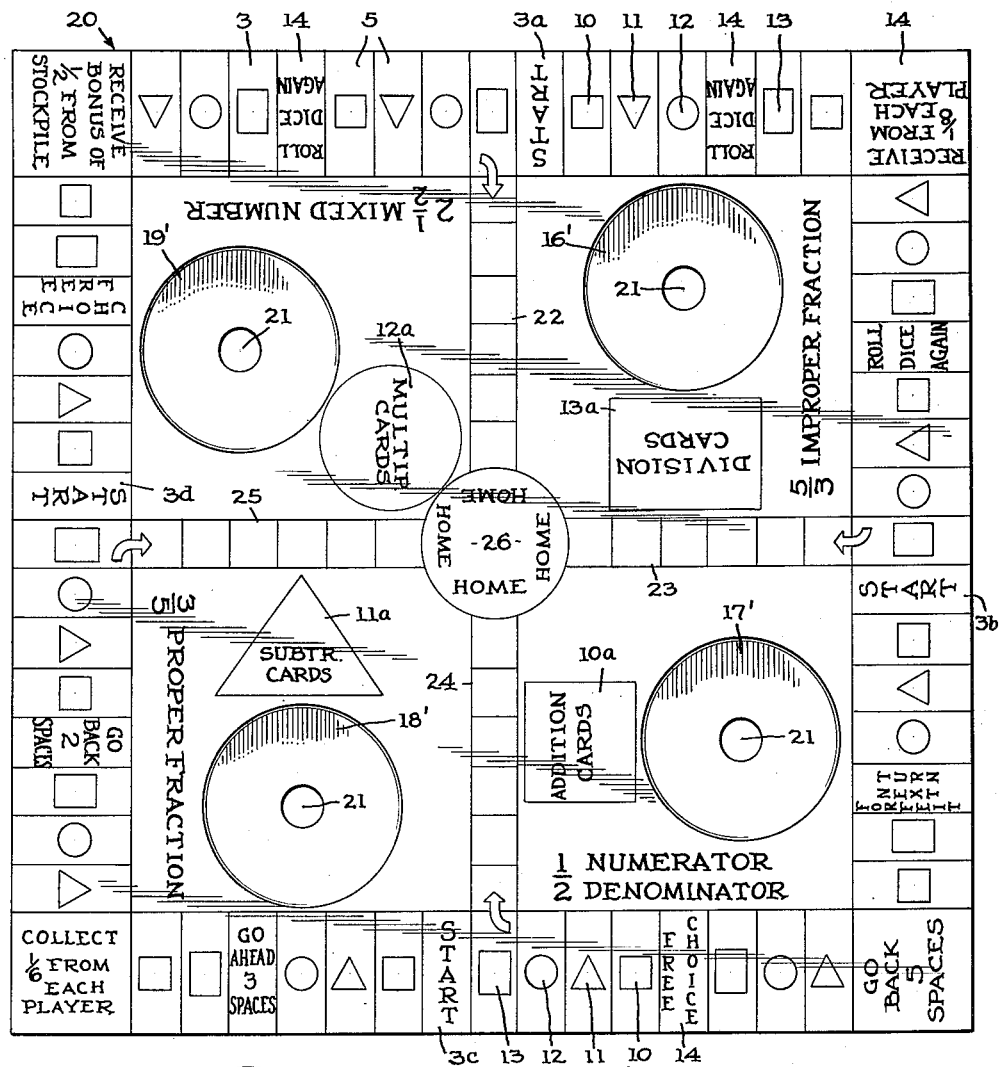
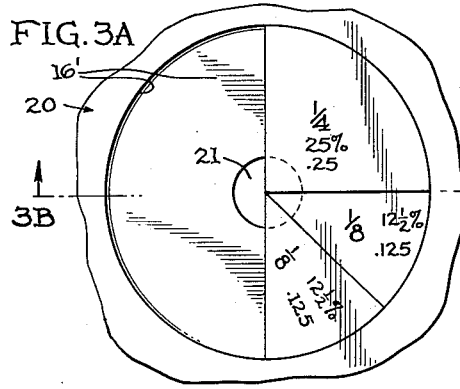

Sept. 17, 1963    J. T. KENNEY ETAL    3,104,106
ARITHMETICAL TEACHING AID GAME
Filed Aug. 31, 1960    4 Sheets-Sheet 4
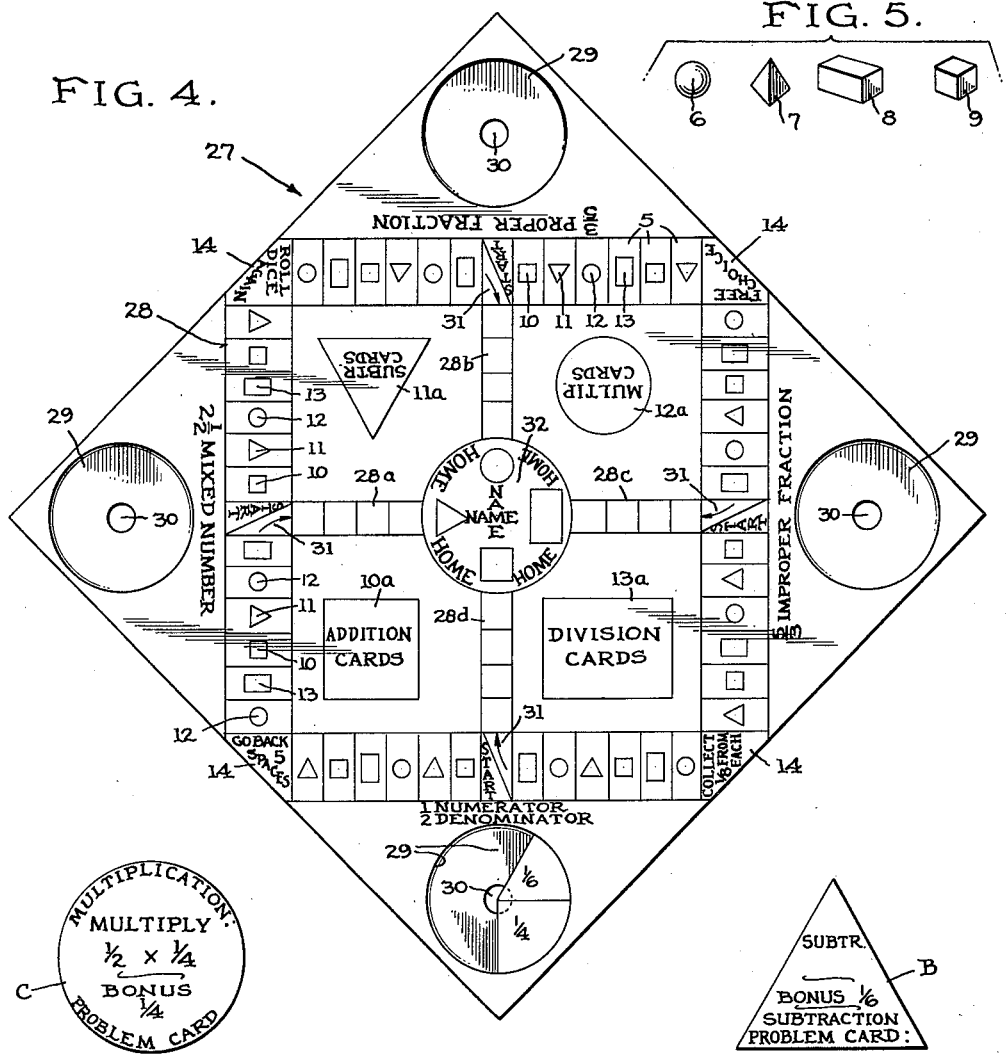
FIG. 4.
FIG. 5.
FIG. 4C.
FIG. 4B.
FIG. 4D.
FIG. 4A.
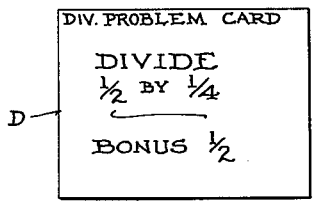
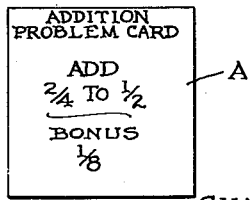
INVENTORS
JAMES T. KENNEY
CHARLES J. O'LOUGHLIN
BY *John E. Becker*
ATTORNEY United States Patent Office 3,104,106
Patented Sept. 17, 1963

3,104,106
ARITHMETICAL TEACHING AID GAME
James T. Kenney and Charles J. O'Loughlin, Silver Spring, Md., assignors of thirty-three and one-third percent to John E. Becker, Silver Spring, Md.
Filed Aug. 31, 1960, Ser. No. 53,256
11 Claims. (Cl. 273—134)

This invention relates to educational devices and more particularly to teaching aids in the form of game apparatus for teaching fractional arithmetic.

While it is possible to learn mechanically the various processes required to solve fractional arithmetical problems in the abstract, there is often lacking a tie-in relationship between the mechanical process being used and the reasons for following the prescribed mechanics.

Accordingly, it is a primary object of this invention to provide a teaching aid in the form of game apparatus by which the principles of the instant invention may be taught by providing manipulative sectoral or fractional devices whereby each pupil may manipulate the fractional parts thereof by direction from a chance derived problem-bearing game card, so as to more clearly facilitate the transformation of an abstract written or oral problem into concrete and more understandable or tangible form. This is accomplished by providing the pupils or players of this game with concrete or physical fractional parts having the various abstract mathematical symbols provided thereon, such as in printed, typed or any other suitable form, said parts being used in conjunction with a game board and other game playing apparatus.

Another primary object of this invention is to provide challenging and purposeful educational game means comprising a plurality of whole and sectoral or fractional disc elements, together with arithmetical problem cards, in association with a game board having routes of travel for game pieces which are movable there along by chance, and so coordinated whereby children and adults can physically manipulate the various fractional parts in an effort to solve a variety of fractional and/or decimal and percentage type arithmetical problems printed on chance-drawn game cards.

Another object is to provide novel and useful teaching aid means according to the aforementioned objects which is simple to use by both children and adults, and which, easily, graphically and tangibly illustrates and teaches the relationship of fraction, decimal and/or percentage parts with respect to the whole part in an enjoyable and practical manner.

A still further object of this invention is to provide a novel and useful teaching aid of the aforementioned type wherein the game board is further provided with flat circular 360° disc-shaped indicia or recesses upon or within which the fractional disc segments or elements are physically interrelated and manipulated either in a common plane or in superposed and peripherally aligned supported relation therein while solving a given problem during game play.

Yet a further object is to provide a simple, colorful, attractive and effective teaching aid of the class described which may be compactly and relatively inexpensively manufactured, thereby making it desirable for both home and school use.

These and other objects and advantages of this invention will become more fully apparent from the following detailed description, taken in conjunction with the illustrative drawings, and the novel features thereof will be defined in the appended claims.

In the drawings:

FIG. 3 is a top plan view of still another modified form of game playing board which includes a common home or finish goal for the respective players;

FIG. 3A is an enlarged detail view representative of a fragmentary portion of either of the boards of FIGS. 3 and 4 showing a 360° circular recess in the form of a whole unit provided in the playing surface of the board and within which a plurality of fractional parts are cooperatively shown as they may be manipulated with respect to the whole unit recess during the problem-solving play of the game;

FIG. 3B is a fragmentary cross-sectional detail view through the recess of FIG. 3 and as may be seen substantially on line 3B—3B, with some of the fractional parts shown in dotted outline;

FIG. 4 is a top plan view of still a different modified embodiment in which the playing board of this invention may be made;

FIGS. 4A, 4B, 4C, and 4D are illustrative of top plan views of the respective different flat geometrically shaped problem cards used in conjunction with this invention; and FIG. 5 is a perspective view of the different preferred forms of game pieces which the players may use to traverse the routes of travel during game play.

Figure 1:
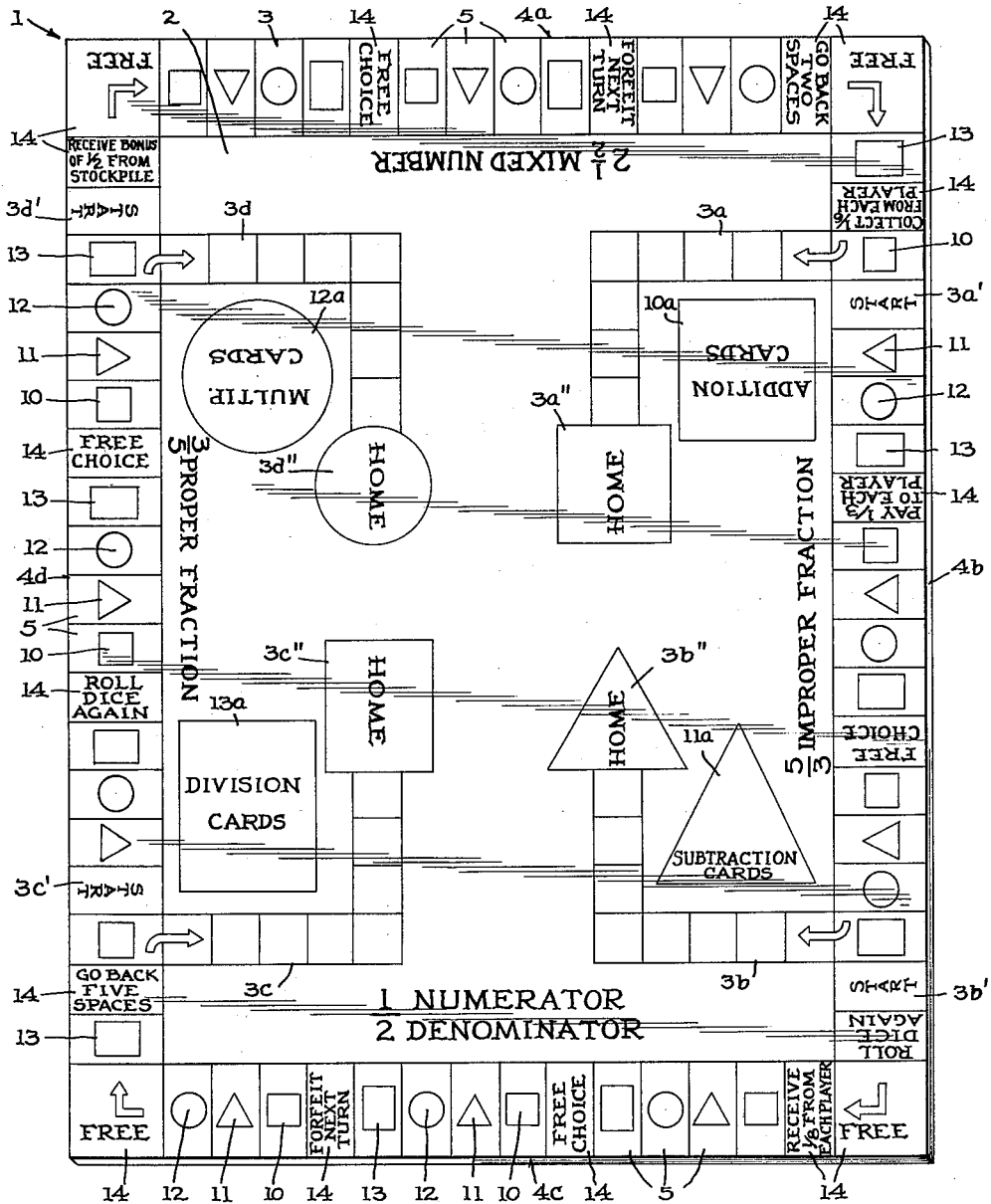
FIG. 1 is a perspective plan view illustrative of one preferred form of the game playing board of this teaching aid.

Referring now to the drawings, like reference characters designate corresponding parts throughout the several figures of the drawings. FIG. 1 is illustrative of one form of playing board used in conjunction with the game apparatus of this invention wherein 1 generally designates the playing board having a generally flat playing surface 2 provided with a preferably clockwise directed marginal travel route 3 around the four playing sides 4a, 4b, 4c and 4d. The two end sides 4a and 4c are shown as being of shorter length than the other two longitudinal sides 4b and 4d, thus comprising a rectangular shaped board. The marginal travel route 3 is divided into a plurality of segmented spaces 5 which constitute stopping points in the movement of playing pieces 6, 7, 8 and 9 (see FIG. 5) along said route. Some of these spaces 5 constitute initial starting points or spaces and are labeled "Start" as indicated at $3a'$, $3b'$, $3c'$ and $3d'$, and which are disposed around the board at spaced intervals. Preferably directly adjacent each of said starting spaces, in a counter-clockwise direction and leading inwardly toward the center of the board 1 and away from the travel route 3, there are provided a plurality of branch travel routes $3a$, $3b$, $3c$ and $3d$, respectively, which constitute separate segmented finish or home goal paths of travel for the respective playing pieces. As shown in FIG. 1, each goal route terminates in a separate home goal $3a''$, $3b''$, $3c''$ and $3d''$ respectively, although the home goal paths may lead to a common home goal as shown in the other embodiments of FIGS. 3 and 4. The players must take turns and move their respective playing pieces clockwise around one complete circuit of the marginal travel route 3 before they can move up their respective home goal branch paths of travel. These branch home goal travel routes may or may not be provided with the geometrical shaped symbols or indicia.

The movement of the playing pieces around the board is controlled by any suitable chance means such as dice or a well-known rotatably mounted pointer which when spun comes to rest pointing to one of a plurality of differently numbered segments to indicate the number of consecutive spaces a player can move his playing piece.

Most of the spaces 5 of the travel route 3 are repeatedly provided with a particular series of indicia preferably in the form of colorful and distinctive plane geometrical figures. Each series of said indicia preferably includes four either consecutive or interrupted different figures corresponding to a square 10, a triangle 11, a circle 12, and a rectangle 13. Provided inwardly of the marginal route of travel 3 on the board's playing surface 2, there is also provided indicia in the form of four enlarged plane geometrical figures 10a, 11a, 12a and 13a corresponding to the same four shapes aforesaid, but which are used to position thereon different sets of problem or direction cards A, B, C and D. Each set preferably has the same respective configurations as the marker indicia upon which it is positioned. Also each set of the said cards may be devoted to a different specific form of fractional arithmetical problem. For example, the square shaped cards A (see FIGS. 4A, 4B, 4C and 4D) may be devoted to problems in addition, whereas the triangle shaped cards B may contain subtraction problems, while the circular cards C and rectangular cards D may be devoted to multiplication and division problems respectively, it being further desirable that the card sets be of a color corresponding to the same color of the respective placement indicia 10a, 11a, 12a, and 13a and also similarly to that of the different space indicia 10, 11, 12 and 13 respectively.

Certain other spaces 5 of the route of travel 3 may contain legend indicia 14, said legend-bearing spaces 5, being interspersed along the path 3 to interrupt the geometric series and serving to further direct the movement of the player's piece or prescribed additional play procedure for the players to follow, should their pieces, by chance, land upon any one of the said legends 14, thus interjecting further interest into the game as the players proceed in their travel around the travel route 3. The following of the procedure prescribed by these legends 14 may result in either penalty or benefit to the player payable in the fractional parts aforesaid.

Although the game play is fairly apparent from the foregoing, the operation of this particular form of FIG. 1 will now be described.

The sets of problem-bearing or direction cards A, B, C and D are placed upon their correspondingly shaped indicia 10a, 11a, 12a and 13a respectively upon the board 1. The game may be played with from one to four players, or as a partnership game, with eight players or any reasonable combination of players as may be agreed upon.

Each player receives from a central stockpile or Bank two of each of the whole and fractional manipulative disc parts including two wholes, two halves, two fourths, two eighths, two thirds and two sixths to start the game. Each different group of the fractional parts are preferably of a different color so as to better see their relationship as they are manipulated to solve the different problems. Also each of the fractional parts, in addition to being provided with its proper fractional designation, such as ¼, may be further provided with its decimal and percentage equivalent such as .25 and 25% respectively, to further concurrently familiarize the pupils with these equivalents.

Upon starting the game, the several players each select one of the game pieces 6, 7, 8 or 9 to represent his moves around the board, in a given and preferably clockwise direction, beginning from his starting position. The order of play may be determined by the player who throws the highest number with the dice. Also, the numbers thrown by the dice determine the number of squares or spaces which a player moves along the route of travel 3. Each space on the board requires the player to follow a particular course of action.

When a player lands on a space containing any of the four geometric figures, he is required to take a problem card from the top of that deck of cards corresponding to the geometric figure upon which he has landed. The four different shaped and different colored sets, contain a plurality of cards respectively relating to mathematical processes of addition, subtraction, multiplication and division, and direct the individual player to complete or solve, by physical manipulation of the sectoral or fractional parts in his possession, the particular problem on the card he has drawn. For example, if the player draws an addition problem card directing him to add two-fourths to one-half, he can physically manipulate or place two of his fractional parts marked ¼ in alignment with or beside one of his parts marked ½ to visually more readily see and understand that they combine to make a complete whole unit, and can further visually check this by physically placing the said parts in superposed position upon a whole disc unit.

Alternatively, if he were directed to subtract two-eighths from one-half, he would have to determine how many of his pieces marked ⅛ would take the place of or fit upon one of his pieces marked ¼ or a piece marked ½. By trial and error of physical manipulation of the parts relative to each other, he can visually observe that two of his ⅛ parts fit upon or equal a single ¼ part, or that four of his ⅛ parts will fit upon or equal a single ½ part, thereby being able to more readily understand that two of his ⅛ parts are the same as a ¼ part, or that four of his ⅛ parts are the same as a ½ part. Now, to complete his instant problem, he would further perceive that by substracting two of the ⅛ parts from the four ⅛ parts making up the ½ piece, that he would have only two ⅛ parts left. To further reduce this he could further compare these two ⅛ parts as aforesaid to see that these latter two parts will fit upon and thereby be equal to a single ¼ part.

Each of the problem cards contains additional indicia indicating a bonus to be paid from the central stock pile or Bank to the player in some fractional part for correctly solving the problem. The individual player must perform the manipulative operation and solving of the instant problem correctly to the satisfaction of the other players, and failing to do this results in loss of the aforementioned bonus. When a player does not have a sufficient number of parts to fully manipulate a problem, he must make exchanges with the stockpile or with other players, of the parts he has in his possession for the parts needed, with the exchanges being equal in value.

Inasmuch as the travel around the board is regulated by chance, it is quite possible that a player's piece may land upon a space containing the legend indicia 14 thereon. In such an event, the player must also follow the directions which may result in either penalty or added benefits to him, from direction which may include the following: "Go back 2 spaces"; Receive bonus of ½ from stockpile"; "Free choice"; "Free standing"; "Roll dice again"; "Go ahead 1 space"; "Forfeit next turn"; "Pay ⅓ to each player"; and so forth.

Each player, in his respective turn, proceeds in the above-described manner around the board once and up his respective home goal path until he reaches his home goal. The first player to reach his home goal receives an additional predetermined bonus, such as one-half fractional part, but then he must wait for the other players to complete their travel around the board and until they, too, reach their respective home goals, before it can be determined who is the winner. At this time, the player that has the highest score by totaling all the fractional and whole parts in his possession, is declared the winner, and not necessarily the player who first completed the trip around the board.

Figure 2:
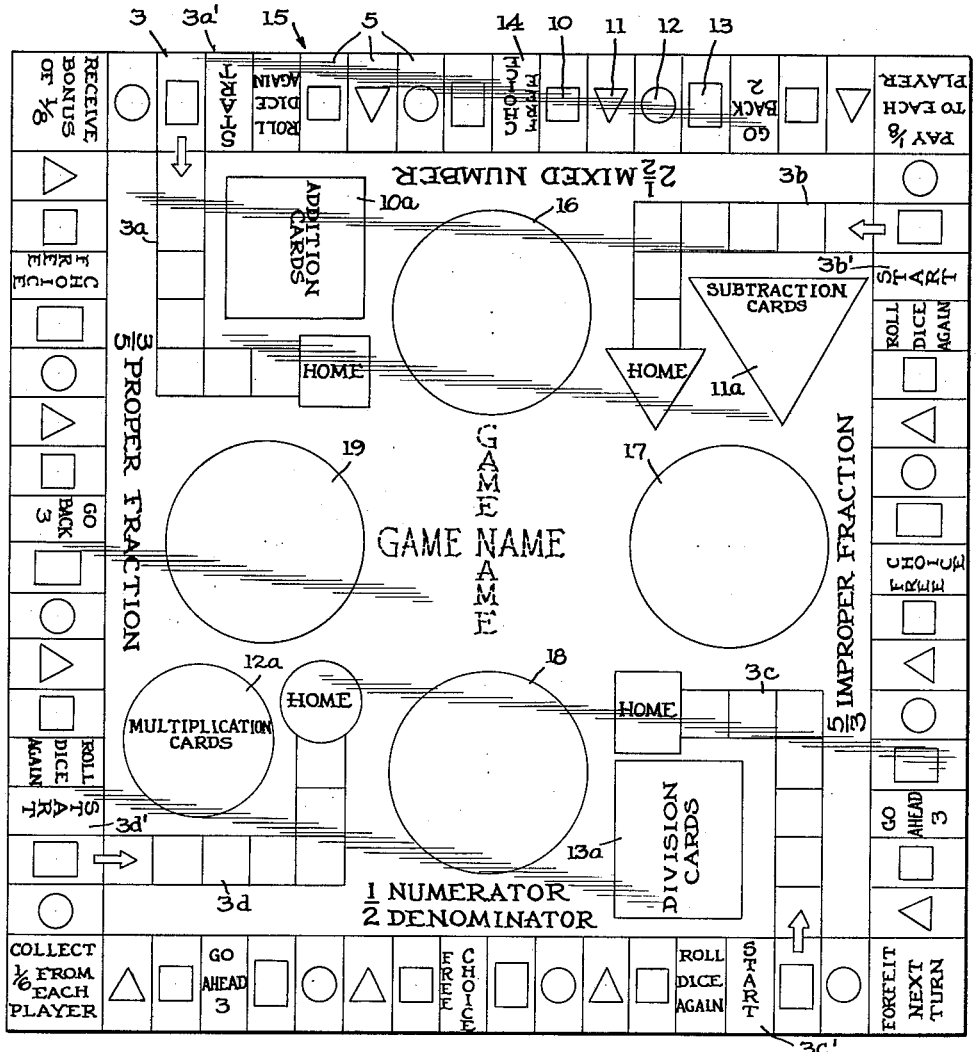
FIG. 2 is a top plan view of a slightly modified form of game playing board, and like the board of FIG. 1 is provided with separate home or finish goals for the respective players.
Figure 2A:
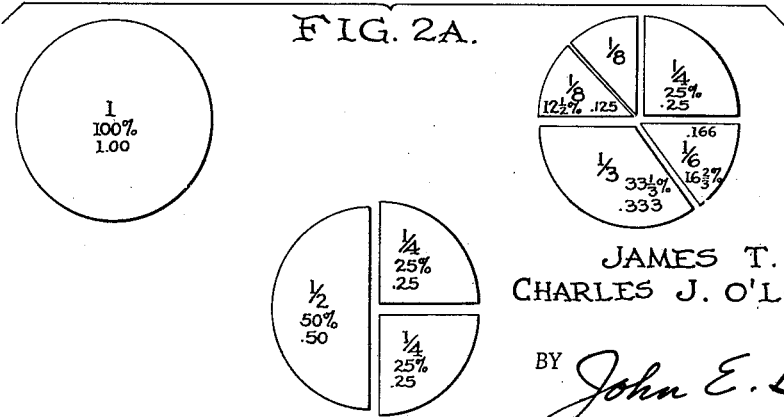
FIG. 2A is a top plan view of a whole unit and of the different sectoral or fractional parts comprising a whole unit with which the fractional arithmetical problems are solved by physical manipulation.

Considering next FIG. 2, which is illustrative of a modified game board designated 15, said board 15 has routes of travel and other indicia which are basically the same as those disclosed in FIG. 1, and therefore are identified by the same reference numerals. However, all four playing sides are equal to form a square playing board wherein each of the starting spaces 3a', 3b', 3c' and 3d' are herein disposed on a different side of the board. An additional important difference of the game board of FIG. 2 over the game board FIG. 1, is the provision of a plurality of circular indicia work areas denoted 16, 17, 18 and 19, each coresponding in size to one of the whole disc units and each being located inwardly adjacent each of the four playing sides in a manner conveniently accessible by the respective players during game play. The manipulative whole and fractional parts comprising a whole, as well as the said work areas, are prefereably of circular form because a circle more readily lends itself to physical and visual fractionation. However, if desired the said respective elements and areas may have other forms such as squares and so forth. The purpose of the said work areas is to provide a more interrelated cooperative area in conjunction with the playing board upon which the fractional parts may be more readily and conveniently manipulted for comparison purposes during the solving of a given fractional problem.

Referring to FIG. 3, there is shown another modified embodiment of a square playing board 20 having substantially the same basic form and pattern of peripheral or marginal travel route 3 as that of FIG. 2. The circular indicia work areas of this board may be the same as those work areas 16, 17, 18 and 19 of the board of FIG. 2, or additionally and as shown, they may be recessed into the playing board 20 as designated at 16', 17', 18' and 19'. Said recesses more advantageously afford the players with a confined and better defined manipulative work area within which the fractional disc segments or parts are more readily circularly aligned for comparative purposes either in a common plane and within the circular confines of the recess and/or in superposed relation as the case may be, inasmuch as the recesses are preferably of a depth coresponding to multiples of the thickness of the fractional parts being used (see FIG. 3B).

Another difference of the board 20 of FIG. 3 over the boards of FIGS. 1 and 2, is that the respective starting spaces, labeled "Start," and the respective adjacently but inwardly or centrally directed home goal paths of travel are positioned substantially midway of the corners of the board, with the latter paths designated 22, 23, 24 and 25, terminating in a centrally located common home goal designated 26. Inasmuch as the rest of the game board indicia is basically the same as that of the previously described playing boards of FIGS. 1 and 2, many of the same reference numbers are again used to identify said coresponding indicia thereof.

FIGS. 3A and 3B illustrate the details of the recesses on an enlarged scale, wherein each recess is also provided with a central aperture 21. Said aperture 21 may be used to aid in the removal of the various fractional and/or whole disc segments therefrom by merely inserting a fingertip up through aperture 21 from below, as shown in FIG. 3B, particularly in cases wherein several fractional parts may be manipulatively involved, and which complete a whole unit, thus fully filling the area of the recess.

Coming now to a further modification of playing board as illustrated in FIG. 4, this board 27 is also of square configuration but is disposed in a diamond fashion relative to the players, but with the basic playing field and travel routes thereof being substantially the same as those of FIG. 3. That is, the square playing field or basic route of travel as indicated at 28 is still disposed squarely relatively to the players, but with the corners of said basic travel route 28 bisecting the lateral edges of the board 27 per se, as clearly shown in FIG. 4. Inasmuch as the geometrical and legend indicia and the segmented travel spaces of this embodiment are substantially the same as in the other embodiments many of the same reference numerals are also used herein to designate these corresponding portions of this board, except where specifically designated otherwise. The recessed areas designated herein as 29 and having central apertures 30, correspond identically in form to those designated 16', 17', 18' and 19', having apertures 21, respectively, in the previously-described embodiment, but are preferably positioned outwardly of the generally square shaped travel route 28, and are disposed in the corners of the board 27. This arrangement permits the recesses 29 to be more closely adjacent the respective players, giving them easier access to these circularly defined disc work areas interrelated with the board and within which to physically manipulate the fractional disc parts during the solving of a problem.

Similarly, the game boards of FIGS. 2 and 3 may be arranged with their respective circular indicia or recessed work areas disposed outwardly of a smaller perimetered travel route 3 disposed substantially parallel to and inwardly of the extreme edges of the board. Thus, one or more of the work area indicia or recessed areas may be provided along each marginal edge of the board in closer proximity to the players.

In the board 27 of FIG. 4, preferably the middle or central segmental space of each of the four preferably identical playing sides of the travel route 28, are diagonally divided with one side thereof being designated "Start," and the other side thereof preferably having suitable indicia, such as a curved arrow 31, pointing up the respective branch routes 28a, 28b, 28c and 28d, respectively, which lead to a centrally positioned common home goal designated 32. Said goal may further include small individual plane geometrically shaped indicia corresponding to that of the preferably three-dimensional playing pieces 6, 7, 8 and 9 as shown in FIG. 5.

Where the overall size of these different square-shaped boards is desired to be maintained of one predetermined size, then the travel route 28 of FIG. 4 will be reduced in perimeter and accordingly will inherently have less segmented spaces 5. Therefore, it is preferable to utilize only the corner spaces upon which to print the extra legend indicia 14.

In each of the foregoing illustrated game boards, additional legend indicia has been provided thereon either along the inner or outer edge of the respective marginal travel routes, to further emphasize the various correct nomenclature and form of the various fractional and mixed numbers or components thereof. The geometric shapes and their names are also present on the playing board for familiarizing the players therewith. These constantly serve as further static visual teaching aids to the player-pupils.

FIGS. 4A, 4B, 4C and 4D are illustrative of the different sets of problem cards used in this game. Each has printed thereon illustrative or sample direction problems and the bonus payable for correctly solving the respective problems.

The game of this invention is used preferably as a teaching aid for pupils beginning to learn fractions, decimals or percentages of approximately the fourth grade public school level. It is recommended that beginner pupils of fractions play the game only with the addition set of cards in use until they become sufficiently in command of the processes and concepts involved in working the addition fractional type problems. The other decks or sets of problem cards are preferably introduced into game play in the following order: subtraction, multiplication and finally divison. In the event a player lands upon a space having a geometrical shape corresponding to one of the sets of cards not in play, then the player must move up to the next space having a geometrical shape thereon corresponding to a set of cards which is instantly in game play.

It is further contemplated that advanced fractional problem cards, to be known as "enrichment" cards, may be made available for play by advanced students or players of this game, and which would preferably involve problems which must be solved only with the fractional pieces present in the player's possession at the time the enrichment card is drawn.

Accordingly, from the foregoing, it is apparent that an improved teaching aid has been invented which achieves the objects and advantages as set forth in the preamble of this specification, by providing more specifically, game apparatus comprising in combination a playing board having a marginal primary route of travel and a plurality of secondary or branch travel routes; a set of individually distinctive geometrically shaped game pieces for registering movement and position of each player along said travel routes, means for determining by chance the extent of travel of each player's playing piece along said travel routes during a given turn of play; said travel routes including segmented spaces some of which are provided with various plane geometrically shaped indicia and which constitute some of the various stopping points therealong, while other of said spaces interspersed among the foregoing spaces are provided with legend indicia prescribing additional procedure to be followed by a player responsive to landing thereon, which results in extra penalties and/or benefits to the players, a plurality of arithmetical problem-bearing direction cards, said cards including different sets of fractional problems to be manipulatively worked according to different mathematical processes including addition, subtraction, multiplication and division, said sets of problem-bearing cards being of different colors and of different plane geometrical shapes including a square, a triangle, a circle and a rectangle, respectively; a plurality of hand manipulative fractional and whole disc parts adapted to be manipulated relative to each other according to direction of and in an effort to solve each fractional arithmetical problem appearing on the problem cards drawn from the set of cards corresponding in shape and color to the geometrical symbol on the space which the player's playing pieces landed; said problem-bearing cards also having legend indicia thereon indicating a bonus payable in some fractional part from a central bank supply for the successful solving of the problem; and with the winner of the game being determined by the player accumulating the greatest number of whole and fractional parts after each player has completed a full circuit of the travel routes.

While specific forms and details have been described herein, various other changes and modifications can be made without departing from the spirit and scope of our invention as defined in the annexed claims.

We claim:

1. Teaching aid game apparatus comprising, in combination, a plurality of elements including: a plurality of whole and physically proportional fractional manipulative unit parts of said whole constituting a central supply bank with a predetermined number of each of said parts being dispersed to each player prior to commencement of the game and adapted to be hand manipulated during game play to solve by physical relative comparison and direction different kinds of arithmetical problems, a game board having a segmented travel route, a majority of the segments having geometrical shaped symbols thereon, a plurality of individual game pieces adapted to be moved along said travel route, groups of different arithmetical problem cards bearing problem indicia involving direct use of the aforesaid manipulative units, said problem cards being related to the board and having various geometrical shapes corresponding to those geometrically shaped symbols provided on certain of said travel route segments, and chance-controlled means for determining the extent of movement of the game pieces along said travel route and consequently for determining the group from which a particular problem card is drawn responsive to a playing piece landing on a segment having one of the geometrical symbols thereon, said elements being so relatively coordinated as to enable the players of the game to tangibly and visually solve a variety of arithmetical problems by physically manipulating and visually comparing the fractional parts with relation to each other and to a whole unit.

2. Teaching aid game apparatus as defined in claim 1, wherein the travel route is provided with a plurality of segmented branch travel routes leading therefrom to a home goal.

3. Teaching aid game apparatus as defined in claim 1, wherein certain other of the segments of the travel route are provided with legend indicia prescribing additional play procedure to be followed by a player whose playing piece lands thereon, and resulting in added benefits and penalties to the players.

4. Teaching aid game apparatus as defined in claim 1, wherein the different groups of problem cards include an addition group, a subtraction group, a multiplication group, and a division group.

5. Teaching aid game apparatus as defined in claim 1, wherein the like geometrical shaped symbols on the segments of the travel route are of the same color, and the various groups of problem cards are of colors different from each other but corresponding in color respectively to the corresponding shaped and colored symbols on the respective travel route segments.

6. Teaching aid game apparatus as defined in claim 1, wherein the board is provided with work area indicia disposed apart from said travel route of a size and shape corresponding to said whole manipulative unit and upon which the fractional parts of a unit are visually interrelated and physically manipulated during solving of a given problem.

7. Teaching aid game apparatus as defined in claim 1, wherein the board is provided adjacent the travel route thereof with a recessed work area indicia of a size and shape generally corresponding to a whole manipulative unit and upon and within the confines of which the fractional parts are visually interrelated and physically manipulated relative to each other and to the whole unit during solving of a given problem.

9. Teaching aid game apparatus as defined in claim 1, wherein a generally square travel route is disposed upon a square playing board, whereby the corners of the travel route generally bisect the lateral edges of the playing board, and with the playing board being disposed in a diamond-shaped fashion relative to the players.

9. Teaching aid game apparatus comprising, in combination, a playing board having a marginal route of travel; a set of individually distinctive game pieces for registering movement and position of each player along said travel route; means for determining by chance the extent of each of the playing pieces along said travel route during a given turn of play; said travel route including segmented spaces most of which are provided with various plane geometrically shaped indicia appearing thereon in a repetitive pattern and which constitute many of the various stopping points therealong, while relatively few of said spaces interspersed among the foregoing spaces are provided with legend indicia prescribing additional play procedure to be followed by players responsive to landing thereon and which results in added penalties and benefits to the players; a plurality of decks of arithmetical problem-bearing direction cards, said cards including different sets of fractional problems to be manipulatively worked according to different mathematical processes including addition, subtraction, multiplication and division, said sets of problem-bearing cards being of different colors and of different plane geometrical shapes including a square, a triangle, a circle and a rectangle, respectively; a central supply of physically fractional and whole manipulative parts, a plurality of said latter parts distributed for play and adapted to be hand-manipulated relative to each other according to direction of and in an effort to solve each fractional arithmetical problem appearing on the said problem cards drawn from the set of cards corresponding in shape and color to the geometrically shaped indicia on a given space of the travel route responsive to the playing piece landing thereon, said problem-bearing cards also having legend indicia thereon indicating a bonus payable in some fractional part from said central supply for the successful solving of a problem, and with the winner of the game being determined by the player accumulating the greatest number of whole and physically fractional parts after each has completed a full circuit of the travel route.

10. Teaching aid game apparatus as defined in claim 9, wherein the manipulative parts have the form of flat discs and disc segments.

11. Teaching aid game apparatus as defined in claim 9, wherein the manipulative parts have the form of flat discs and disc segments, and said board being provided with circular work area indicia of a size and shape corresponding substantially to a whole disc unit and upon and within the confines of which the fractional disc parts of a unit are visually and physically interrelated by manipulation of the parts during solving of a given problem appearing on one of said problem cards.

References Cited in the file of this patent

UNITED STATES PATENTS

| 151,971 | Harrington | June 16, 1874 |
| 2,026,082 | Darrow | Dec. 31, 1935 |
| 2,611,193 | Davis | Sept. 23, 1952 |

FOREIGN PATENTS

| 25,370 | Great Britain | 1901 |